(12) United States Patent
Park et al.

(10) Patent No.: US 7,907,391 B2
(45) Date of Patent: Mar. 15, 2011

(54) DISPLAY DEVICE HAVING A DETACHABLE BASE PART

(75) Inventors: Doo-soon Park, Suwon-si (KR); You-sub Lee, Gunpo-si (KR); Hyun-jun Jung, Suwon-si (KR); Kyung-kyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 11/246,250

(22) Filed: Oct. 11, 2005

(65) Prior Publication Data

US 2006/0087596 A1  Apr. 27, 2006

(30) Foreign Application Priority Data

Oct. 25, 2004  (KR) .................. 10-2004-0085240

(51) Int. Cl.
*H05K 5/00* (2006.01)
*H05K 7/00* (2006.01)
(52) U.S. Cl. ........... 361/679.21; 361/679.22; 361/679.26
(58) Field of Classification Search .................. 361/681, 361/682, 679.21, 679.22, 679.26; 248/917–924; 348/794; 345/905; 312/223.2
See application file for complete search history.

(56) References Cited

U.S. PATENT DOCUMENTS

| | | | | |
|---|---|---|---|---|
| 4,690,362 A * | 9/1987 | Helgeland | ................. | 248/404 |
| 5,564,669 A * | 10/1996 | Wu | .................. | 248/346.01 |
| 5,583,529 A | 12/1996 | Satou | | |
| 5,687,939 A * | 11/1997 | Moscovitch | ............... | 248/122.1 |
| 6,163,452 A * | 12/2000 | O'Neal et al. | ................. | 361/681 |
| 6,373,689 B1 * | 4/2002 | Yim | .................. | 361/681 |
| 6,644,616 B1 * | 11/2003 | Tsukuda | .................. | 248/371 |
| 6,702,238 B1 * | 3/2004 | Wang | .................. | 248/125.8 |
| 6,702,604 B1 * | 3/2004 | Moscovitch | ............... | 439/374 |
| 6,712,326 B2 * | 3/2004 | Kurimoto et al. | .......... | 248/349.1 |
| 6,837,469 B2 * | 1/2005 | Wu et al. | .................. | 248/278.1 |
| 6,918,564 B2 * | 7/2005 | Yen et al. | .................. | 248/404 |
| 6,921,057 B2 * | 7/2005 | Chen et al. | ................. | 248/349.1 |
| 6,967,668 B2 * | 11/2005 | Byoun et al. | ................. | 345/55 |
| 7,180,731 B2 * | 2/2007 | Titzler et al. | .................. | 361/681 |
| 7,236,354 B2 * | 6/2007 | Hsu et al. | .................. | 361/681 |
| 7,267,312 B2 * | 9/2007 | Kang et al. | ................. | 248/291.1 |
| 7,268,999 B2 * | 9/2007 | Kim | .................. | 361/681 |
| 2003/0160138 A1 * | 8/2003 | Rawlings et al. | .......... | 248/176.3 |

FOREIGN PATENT DOCUMENTS

| | | |
|---|---|---|
| JP | 2-58822 | 4/1990 |
| JP | 3-113423 | 11/1991 |
| JP | 2001-282115 | 10/2001 |
| KR | 1999-41572 | 12/1999 |
| KR | 2000-1380 | 1/2000 |
| KR | 2004-9338 | 1/2004 |

OTHER PUBLICATIONS

Korean Office Action dated Mar. 30, 2006 of Korean Patent Application No. 10-2004-0085420.

* cited by examiner

*Primary Examiner* — Jayprakash N Gandhi
*Assistant Examiner* — Anthony M Haughton
(74) *Attorney, Agent, or Firm* — Stanzione & Kim, LLP

(57) ABSTRACT

A display device includes a display part, a base part including a neck part projecting from a surface thereof to support the display part, a connecting bracket having a first end formed to be insertable into the neck part, and a guide bracket disposed in the display part to guide a second end of the connecting bracket to be connectable with the display part. Accordingly, the display device can have a slim external appearance and a base part with a simple structure.

40 Claims, 4 Drawing Sheets

DISPLAY DEVICE HAVING A DETACHABLE BASE PART

CROSS-REFERENCE TO RELATED APPLICATIONS

This application claims the benefit under 35 U.S.C. §114 of Korean Patent Application No. 2004-85240, filed on Oct. 25, 2004, in the Korean Intellectual Property Office, the disclosure of which is incorporated herein in its entirety by reference.

BACKGROUND OF THE INVENTION

1. Field of the Invention

The present general inventive concept relates to a display device, and more particularly, to a display device having an improved structure of a base part.

2. Description of the Related Art

Generally, a display device comprises a display part forming a picture thereon and a base part seated on an installation surface such as a table or a wall and supporting the display part. Herein, the display device refers to various types of devices forming a picture thereon, such as TV, a monitor for a computer, etc. The display device mainly employs a flat display panel, such as an LCD (liquid crystal display) or a PDP (plasma display panel).

FIG. 1 illustrates a conventional display device 101. Referring to FIG. 1, the conventional display device 101 comprises a display part 110 forming a picture thereon, and a base part 120 supporting the display part 110 and detachably provided with respect to the display part 110.

The display part 110 comprises a panel part (not shown) forming the picture thereon, a PCB assembly 112 transmitting and receiving electrical signals with the panel part and other devices, and front and rear casings 113 and 114 provided in front of and behind the panel part, respectively, and forming an external appearance of the display part.

At a rear surface of the PCB assembly 112 are formed a pair of guide brackets 140 guiding a pair of supporting bars 123 of the base part 120, which will be described later, and combination bosses 112a accommodating combination pieces 124a of the base part 120. Therefore the base part 120 is detachable with respect to the display part 110.

At a rear surface of the front casing 113, a pair of combination piece accommodating parts 112b are disposed to accommodate combination pieces 124b of the base part 120, which will be described later.

At each of the guide brackets 140, a coupling boss 141 is projectedly formed toward the rear casing 114.

The rear casing 114 is provided with first combination holes 115 and 117 corresponding to the combination bosses 112a and the combination piece accommodating parts 112b for coupling with respective first screws 115a and 115b. The rear casing 114 is also provided with second combination holes 116 corresponding to the coupling bosses 141 for coupling with respective second screws 116a.

The base part 120 comprises a seating part 121 seated on an installation surface and a supporter 122, of which a width is almost corresponding to that of the display part 110, disposed on an upper part of the seating part 121.

On an upper surface of the supporter 122, the pair of supporting bars 123 are mounted to be inserted into the pair of guide brackets 140, and also the combination pieces 124a and 124b, through which the combination bosses 112a and the combination piece accommodating parts 112b can be coupled with the respective first screws 115a and 115b, are extendedly formed.

Each of the supporting bars 123 is provided with a coupling hole 123a, with which one of the second screws 116a is coupled, corresponding to the coupling boss 141 of one of the guide brackets 140.

With this configuration, the combination bosses 112a and the combination piece accommodating parts 112b are coupled with the respective first screws 115a and 115b, which pass through the first combination holes 115 and 117, and the second screws 116a pass through the second combination holes 116 and the coupling bosses 141 of the guide bracket 140 and then are coupled with the coupling holes 123a. Therefore the base part 120 can be coupled with the display part 110.

However, in the conventional display device, the supporter 122 of the display part 110 is formed to almost correspond to the width of the display part 110, so that the external appearance of the base part 120 is large in size.

Further, the structure of the base part 120 is complicated, so that a manufacturing process of the base part 120 is inefficient.

SUMMARY OF THE INVENTION

Accordingly, the present general inventive concept provides a display device having a slim external appearance and a base part with a simple structure.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a display device comprising a display part, a base part which comprises a neck part projecting from a surface thereof to support the display part, a connecting bracket having a first end formed to be insertable into the neck part, and a guide bracket disposed at the display part to guide a second end of the connecting bracket to be connectable with the display part.

The connecting bracket may comprise a combination portion to couple with the guide bracket, and an inserting portion extending from the combination portion to insert into the neck part, wherein the neck part can include a through portion through which the inserting portion passes.

The base part may comprise a base frame to contact an installation surface, and a base cover disposed at an upper portion of the base frame and including the neck part therein, wherein the inserting portion of the connecting bracket passes through the through portion of the neck part and then attaches to the base frame.

A width of the combination portion may be larger than that of the inserting portion, and a lower end of the combination portion may contact an upper end of the neck part.

A plurality of reinforcing ribs disposed in a radial direction may be projectedly formed on the base frame.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
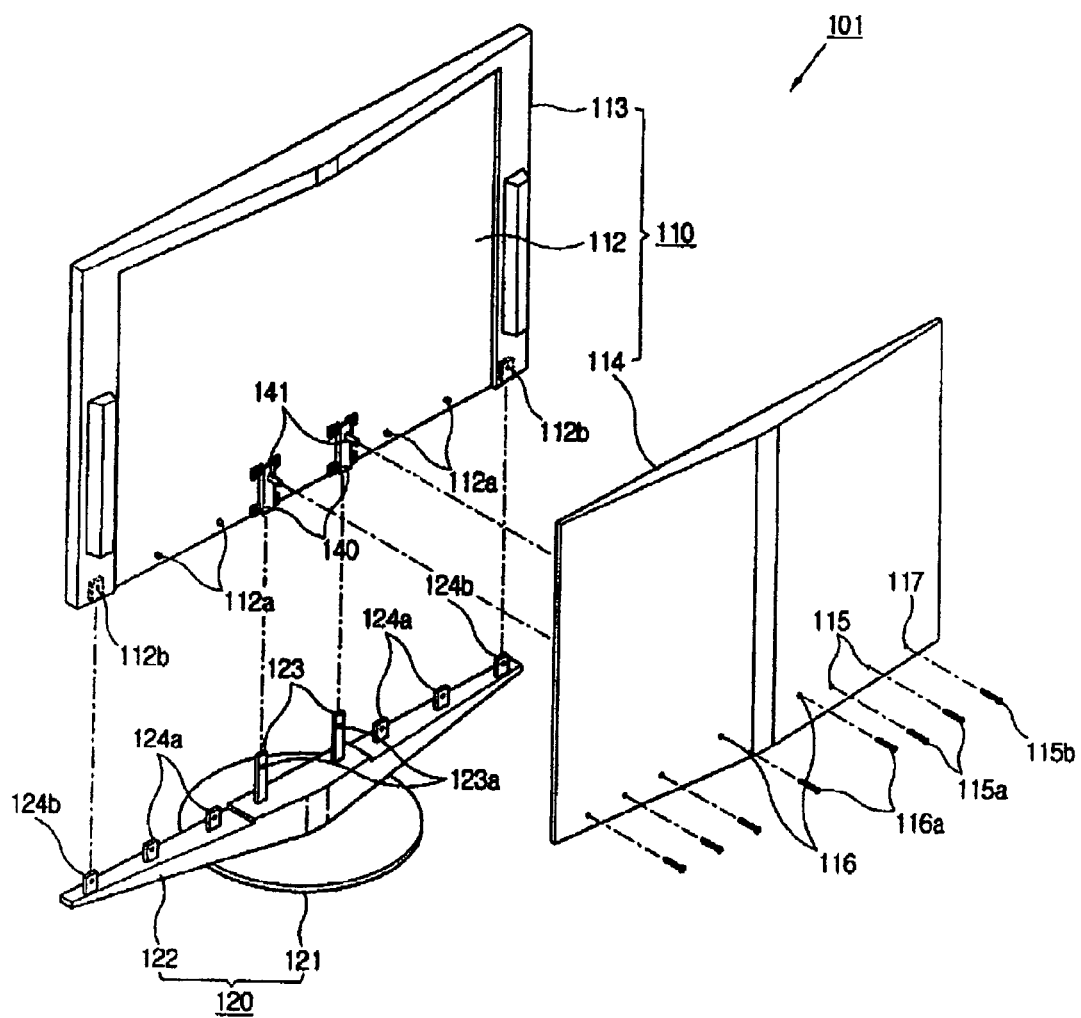
FIG. 1 is a rear exploded perspective view illustrating a conventional display device.

Reference will now be made in detail to embodiments of the present general inventive concept, examples of which are illustrated in the accompanying drawings, wherein like reference numerals refer to like elements throughout. The embodiments are described below in order to explain the present general inventive concept while referring to the figures.

Figure 2:
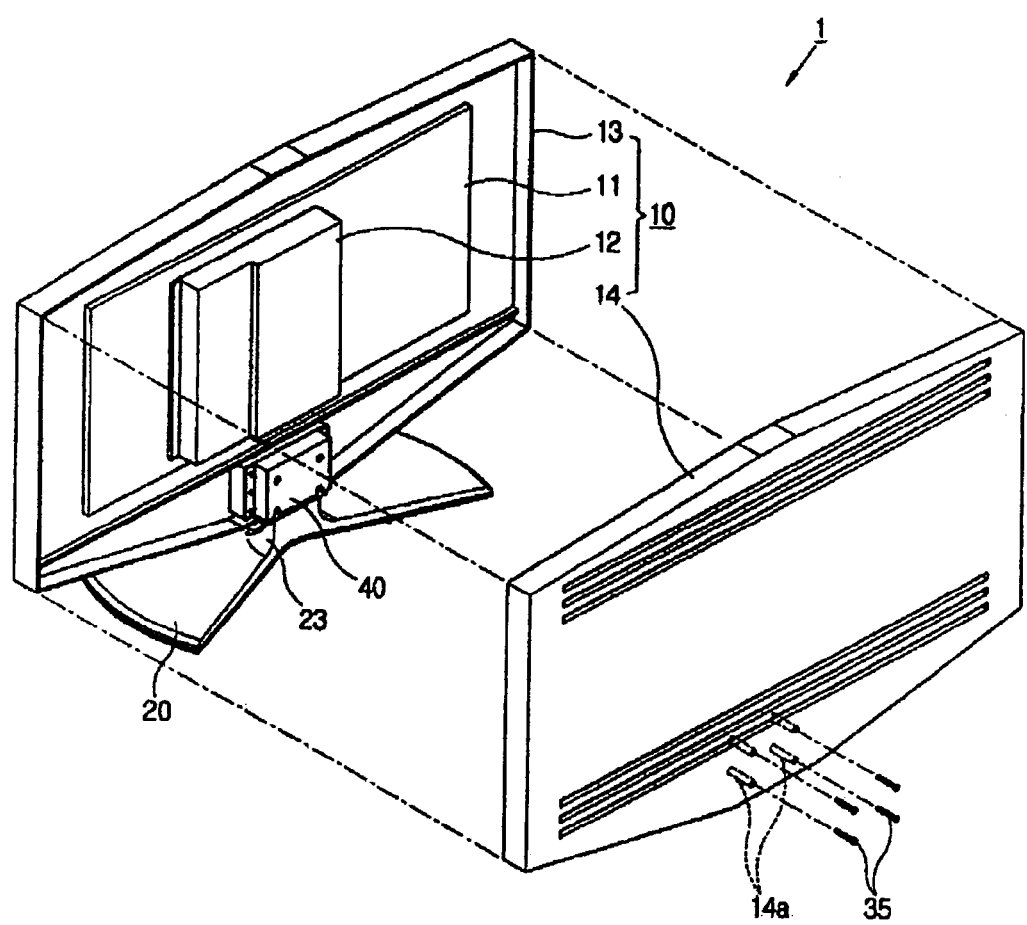
FIG. 2 is a rear perspective view illustrating a display device according to an embodiment of the present general inventive concept.
Figure 3:
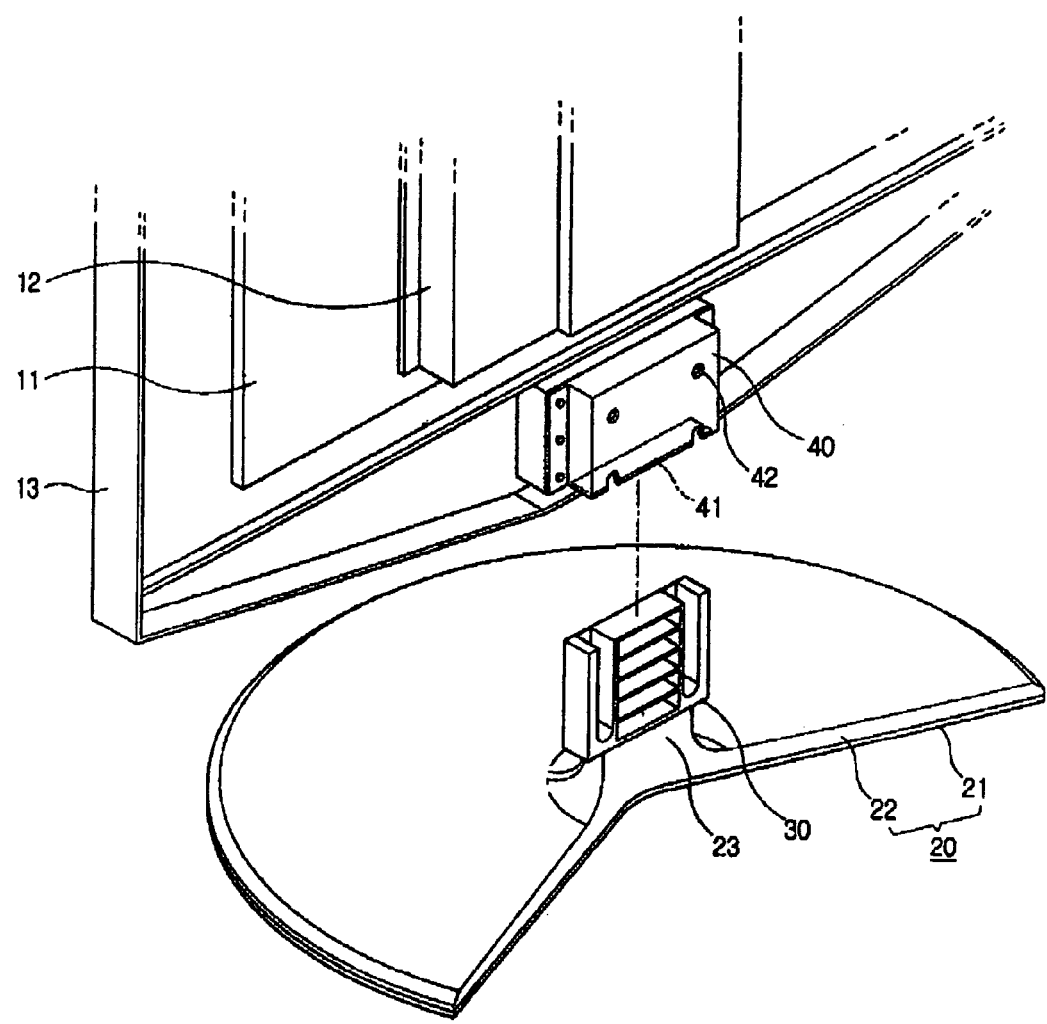
FIG. 3 is a rear perspective view illustrating a base part and a display part of the display device of FIG. 2.
Figure 4:
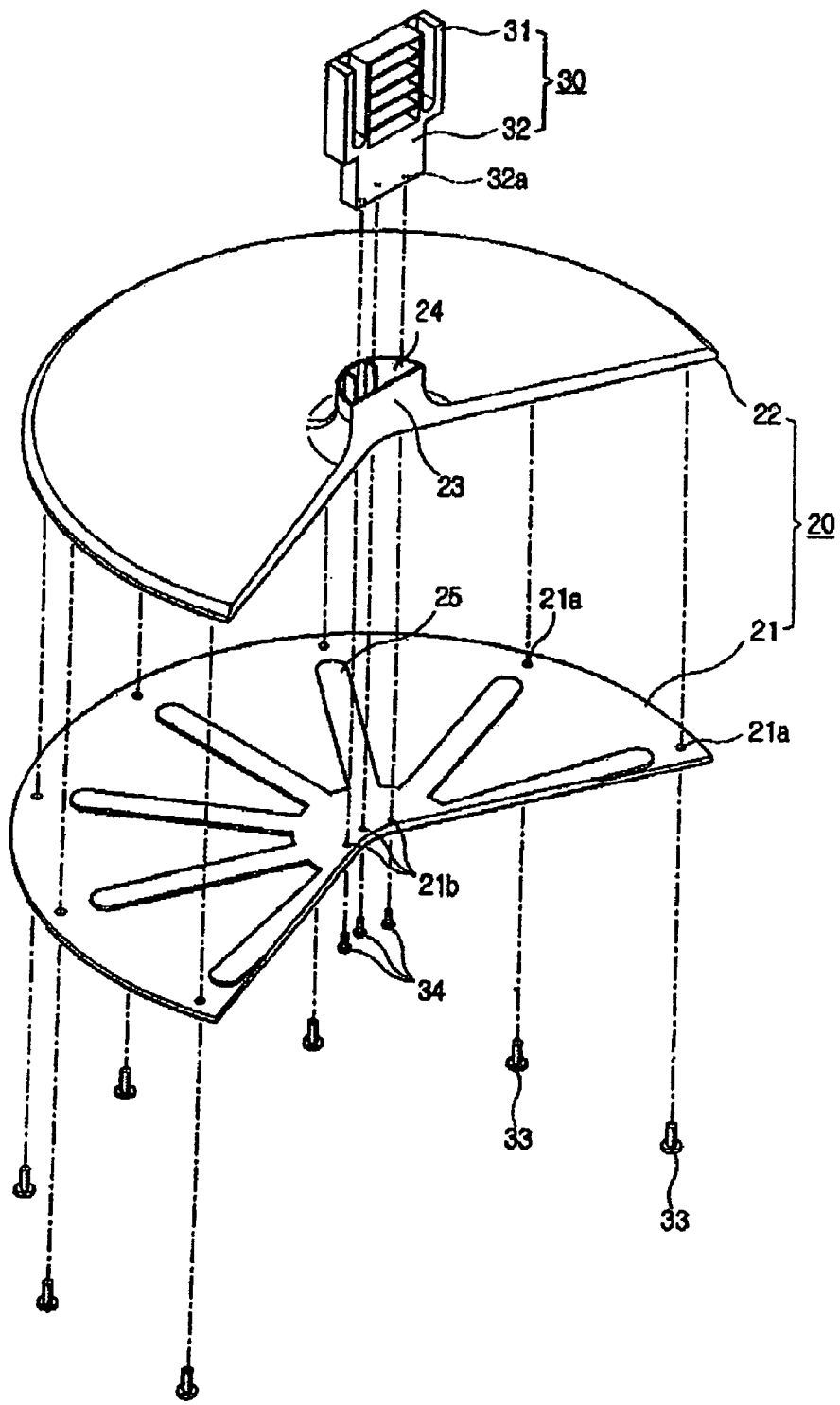
FIG. 4 is a rear perspective view illustrating a connecting bracket and the base part of the display device of FIG. 2.

FIGS. 2-4 illustrate a display device 1 according to an embodiment of the present general inventive concept. Referring to FIGS. 2-4, the display device 1 comprises a display part 10 to form a picture thereon, a base part 20 to support the display part 10 and having a neck part 23 which is projecting from a surface of the base part 20, a connecting bracket 30 of which a first end can be inserted into the neck part 23, a guide bracket 40 disposed at the display part 10 to guide a second end of the connecting bracket 30 to attach to the display part 10.

The display part 10 is detachable from the base part 20. In the case that the display part 10 is attached to the base part 20, it can be used as a stand type display device seated on a horizontal plane, such as a table. However in the case that the display part 10 is detached from the base part 20, it can be used as a wall type display device mounted on a vertical plane, such as a wall.

The display part 10 comprises a panel part 11 to form the picture thereon, a PCB (printed circuit board) assembly 12 to transmit and receive electrical signals between the panel part 11 and other devices, and front and rear casings 13 and 14 provided in front of and behind the panel part 11 and the PCB assembly 12, respectively, to form an external appearance of the display part 10.

At an inner surface of the rear casing 14, a set of hollow combination bosses 14a projecting toward the front casing 13 are formed to couple with the guide bracket 40.

The base part 20 comprises a base frame 21 to contact an installation surface and a base cover 22 disposed at an upper portion of the base frame 21 and formed with the neck part 23.

Around a circumferential area of the base frame 21 a plurality of first screw holes 21a can be penetratingly formed to allow first screws 33 to pass therethorugh. Also, in a central area of the base frame 21 a plurality of second screw holes 21b can be are penetratingly formed to allow second screws 34 to pass therethrough. A plurality of reinforcing ribs 25 disposed in a radial direction can be projectedly formed on a surface of the base frame 21, thereby preventing the base part 20 from bending.

A bottom surface of the base cover 22 can be provided with coupling bosses (not shown) corresponding to the first screw holes 21a to couple with the first screws 33. The first screws 33 pass through the first screw holes 21a and couple with the coupling bosses. Accordingly, the base frame 21 can be coupled with the base cover 22.

The neck part 23 projects outward from a central portion of the base cover 22. A through portion 24 into which the first end of the connecting bracket 30 can be inserted is penetratingly formed in the neck part 23. With this configuration, the display device 1 including the neck part 23 can be slimly formed. Here, the neck part 23 is strong enough to support the display part 10 and may be formed as a single body with the base cover 22.

The connecting bracket 30 can be nearly T-shaped, and comprises a combination portion 31 (i.e. the second end) to couple with the guide bracket 40 and an inserting portion 32 (i.e. the first end) extending from the combination portion 31 to be inserted into the through portion 24 of the neck part 23. Here, a width of the combination portion 31 can be larger than that of the inserting portion 32, such that a lower end of the combination portion 31 can stably contact an upper end of the neck part 23 when the inserting portion 32 is coupled with the through portion 24 of the neck part 23.

Third screw coupling holes (not shown) are formed at the combination portion 31 of the connecting bracket 30, to allow third screws 35 to couple the guide bracket 40 with the connecting bracket 31. The third screws 35 pass through the hollow combination bosses 14a of the rear casing 14 and through the combination boss holes 42 of the guide bracket 40 and then couple with the third screw coupling holes (not shown) of the combination portion 31. Accordingly, the connecting bracket 30 can be coupled with the display part 10.

Coupling holes 32a can be formed on a bottom surface of the inserting portion 32 of the connecting bracket 30 to couple with the second screws 34, which pass through the second screw holes 21b of the base frame 21. The second screws 34 pass through the second screw holes 21b of the base frame 21 and couple with the coupling holes 32a of the inserting portion 32. Accordingly, the connecting bracket 30 can be attached to the base part 20.

The guide bracket 40 is mounted at a lower portion of a rear surface of the front casing 13, and the combination boss holes 42 are formed at a surface thereof to allow the combination bosses 14a of the rear casing 14 to pass therethrough. The guide bracket 40 can have a rectangular box shape, and an open portion 41 can be formed on a bottom surface thereof to couple with the combination portion 31 of the connecting bracket 30. A pass-through portion can be formed at a bottom surface of the rear casing 14 to correspond to the open portion 41 of the guide bracket 40 to allow the combination portion 31 of the connecting bracket to pass therethrough. The combination portion 31 of the connecting bracket 30 passes through the pass-through portion of the rear casing 14 and the open portion 41 of the guide bracket 40, and then couples with the third screws 35. Therefore, the connecting bracket 30 can couple with the display part 10.

Although a few embodiments of the present general inventive concept attach to have been shown and described, it will be appreciated by those skilled in the art that changes may be made in these embodiments without departing from the principles and spirit of the general inventive concept, the scope of which is defined in the appended claims and their equivalents.

What is claimed is:

1. A display device comprising:
   a display part;
   a base part which comprises a single neck part projecting from a surface thereof to support the display part;
   a connecting bracket having a first end to be insertable into the neck part in a first insertion direction; and
   a guide bracket located on the display part to guide a second end of the connecting bracket opposite the first end to connect to the display part,
   wherein the second end of the connecting bracket is insertable into the guide bracket in a second insertion direction opposite the first insertion direction.

2. The display device of claim 1, wherein the second end of the connecting bracket comprises a combination portion to couple with the guide bracket, the first end of the connecting bracket comprises an inserting portion extending from the combination portion to insert into the neck part, and the neck part includes a through portion through which the inserting portion passes.

3. The display device of claim 2, wherein the base part further comprises:
- a base frame to contact an installation surface; and
- a base cover disposed at an upper portion of the base frame and including the neck part therein, the inserting portion of the connecting bracket passing through the through portion of the neck part and to be coupled with the base frame.

4. The display device of claim 3, wherein the base frame comprises a plurality of reinforcing ribs disposed in a radial direction.

5. The display device of claim 3, wherein a width of the combination portion is larger than that of the inserting portion, and a lower end of the combination portion contacts an upper end of the neck part when the inserting portion is coupled to the through portion.

6. The display device of claim 3; wherein the base cover and the neck part are integrally formed.

7. The display device of claim 1, wherein the guide bracket comprises an open portion to receive the second end of the connecting bracket.

8. The display device of claim 1, further comprising:
- a rear casing and a front casing to cover the display part such that the connecting bracket and the guide bracket are disposed between the display part and the rear casing, wherein the guide bracket is formed on a rear surface of the front casing.

9. The display device of claim 8, wherein the guide bracket comprises a first open portion to receive the second end of the connecting bracket, and the rear casing comprises a second open portion corresponding to the first open portion of the guide bracket to allow the second end of the connecting bracket to pass therethrough.

10. The display device of claim 1, further comprising coupling screws, wherein the connecting bracket includes first coupling holes and the base part includes second coupling holes aligned with the first coupling holes, and wherein the first coupling holes and the second coupling holes accommodate the coupling screws to couple the connecting bracket and the base part.

11. The display device of claim 10, wherein the first coupling holes are disposed in the first end of the connecting bracket.

12. The display device of claim 1, wherein only a portion of the first end of the connecting bracket is insertable into the neck part.

13. The display device of claim 1, wherein the line is disposed in a vertical direction.

14. The display device according to claim 1, wherein the neck part and the guide bracket support the first and second ends of the connecting bracket, respectively, in each direction perpendicular to the first insertion direction as the first and second ends of the connecting bracket are inserted into the neck part and the guide bracket, respectively.

15. A display device comprising:
- a display unit to display an image thereon;
- a base unit having a base frame extending along a substantially flat plane and a single open neck portion extending in a perpendicular direction with respect to the plane of the base unit towards a bottom surface of the display unit; and
- an intermediate unit having a first end to couple with the display unit and a second end opposite the first end to fit within the open neck portion of the base unit to support the display unit with respect to the base unit,
- wherein the first end of the intermediate unit is insertable into the display unit in a first insertion direction that is substantially perpendicular with respect to the plane of the frame portion of the base unit, and
- the second end of the intermediate unit is insertable into the neck portion in a second insertion direction opposite the first insertion direction.

16. The display device of claim 15, wherein the second end of the intermediate unit has a predetermined width to fit within the open neck portion, and the first end of the intermediate unit has a width larger than the predetermined width such that the first end contacts an edge of the open neck portion when the second end is inserted into the open neck portion.

17. The display device of claim 15, further comprising:
- a guide bracket provided at a surface of the display unit to couple the display unit to the first end of the intermediate unit.

18. The display device of claim 17, wherein the guide bracket comprises an open portion to accommodate the first end of the intermediate unit therein to detachably couple the intermediate unit to the display unit.

19. The display device of claim 15, wherein the base unit comprises:
- a base frame to support the display unit with respect to an installation surface; and
- a base cover formed with the open neck portion to detachably couple with the display unit through the intermediate unit.

20. The display device of claim 15, wherein the display unit comprises:
- a panel to display the image thereon; and
- a front and rear casing surrounding the panel, and one of the front and rear casings having an opening to accommodate the first end of the intermediate unit to detachably couple the intermediate unit to the display unit.

21. The display device of claim 15, further comprising coupling screws, wherein the intermediate unit includes first coupling holes and the base unit includes second coupling holes aligned with the first coupling holes, and wherein the first coupling holes and the second coupling holes accommodate the coupling screws to couple the intermediate unit and the base unit.

22. The display device of claim 21, wherein the first coupling holes are disposed in the second end of the intermediate unit.

23. The display device of claim 15, wherein only a portion of the second end of the intermediate unit fits within the open neck portion.

24. The display device of claim 15, wherein the single open neck portion extends towards the bottom surface of the display unit along the in the second insertion direction.

25. A display device, comprising:
- a display unit to display an image thereon and having a single first accommodating portion;
- a base unit having a frame portion extending along a substantially flat plane and a second accommodating portion extending in a direction perpendicular to the plane of the base unit toward a bottom surface of the display unit; and a connecting unit having a first end of a first predetermined size to be insertable into the single first accommodating portion and a second end of a second predetermined size opposite the first end to be insertable into the second accommodating portion to detachably couple the display unit to the base unit, wherein the first end of the connecting unit is insertable into the first accommodating portion in a first insertion direction substantially perpendicular to the plane of the frame portion of the base unit, the second end of the connecting unit is insertable into the second accommodating portion in a second insertion direction opposite the first insertion direction.

26. The display device of claim 25, wherein the first predetermined size is greater than the second predetermined size, and the first end of the connecting unit comprises a first portion from which the second end extends, and a second portion to contact a surface of the base unit defining the second accommodating portion while the second end is inserted into the second accommodating portion of the base unit.

27. The display device of claim 25, wherein the first accommodating portion comprises:
a guide bracket attached to a surface of the display unit and having an opening therein to accommodate the first end of the connecting unit.

28. The display device of claim 25, wherein the second accommodating portion comprises:
an opened portion of a predetermined shape corresponding to the second end of the connecting unit integrally formed with the base unit.

29. The display device of claim 25, further comprising coupling screws, wherein the connecting unit includes first coupling holes and the base unit includes second coupling holes aligned with the first coupling holes, and wherein the first coupling holes and the second coupling holes accommodate the coupling screws to couple the connecting unit and the base unit.

30. The display device of claim 29, wherein the first coupling holes are disposed in the second end of the connecting unit.

31. The display device of claim 25, wherein only a portion of the second end of the connecting unit is insertable into the second accommodating portion of the base unit.

32. The display device of claim 25, wherein the second accommodating portion extends in the first insertion direction towards the bottom surface of the display unit.

33. A display device, comprising:
a display part;
a base part having a neck part extending from a surface thereof to support the display part;
a connecting bracket having a first end to be insertable into the neck part in a first insertion direction; and
a guide bracket disposed at the display part to guide a second end of the connecting bracket opposite the first end to be connectable with the display part such that the connecting bracket is not exposed to an outside of the neck part and guide bracket when the first end and the second end are connected to the neck part and the display part, respectively,
wherein the second end of the connecting bracket is insertable into the guide bracket in a second insertion direction opposite the first insertion direction.

34. The display device of claim 33, wherein the neck part and the base part are integrally formed.

35. A support structure to support a display device, comprising:
a base part having a neck part with a first opening therein;
a connecting bracket having a first end to be insertable in a first insertion direction into the first opening of the neck part; and
a guide bracket disposed at the display part and having a second opening to guide a second end of the connecting bracket opposite the first end to be connectable with the display part,
wherein the second end of the connecting bracket is insertable into the guide bracket in a second insertion direction opposite the first insertion direction, and
a portion of the second opening of the guide bracket in a lateral direction perpendicular to the first insertion direction overlaps at least a portion of the first opening of the neck part in the lateral direction, such that a line parallel to the first insertion direction passing through the second opening also passes through the first opening when the first end and the second end are connected to the neck part and the display part, respectively.

36. The display device of claim 35, wherein the neck part and the base part are integrally formed.

37. A display device, comprising:
a base part having a neck part extending from a surface thereof to support the display device;
a connecting bracket having a first end to be insertable into the neck part; and
a guide bracket disposed at the display part to guide a second end of the connecting bracket opposite the first end to be connectable with the display part,
wherein the first end of the connecting bracket is insertable into the neck part in a first insertion direction and the second end is insertable into the guide bracket in a second insertion direction opposite the first insertion direction,
and a line parallel to the first insertion direction passing through the neck part also passes through the guide bracket.

38. The display device of claim 37, wherein the neck part and the base part are integrally formed.

39. A display device, comprising:
a base part having a neck part extending in a first direction from a surface thereof to support the display device;
a connecting bracket having a first end to be insertable into the neck part in the first direction; and
a guide bracket disposed at the display part to guide a second end of the connecting bracket opposite the first end to be connectable with the display part,
wherein the second end of the connecting bracket is insertable into the guide bracket in a second direction opposite the first direction, and
a width of the second end is larger than a width of the neck part such that a surface of the second end contacts a surface of the neck part when the first end is inserted into the neck part.

40. The display device of claim 39, wherein the neck part and the base part are integrally formed.

* * * * *